Feb. 6, 1945.　　　R. M. FRAPS　　　2,368,655
WEIGHING SCALE
Filed June 21, 1943　　　4 Sheets-Sheet 1

INVENTOR
R. M. FRAPS

BY

ATTORNEYS

Feb. 6, 1945. R. M. FRAPS 2,368,655
WEIGHING SCALE
Filed June 21, 1943 4 Sheets-Sheet 2

INVENTOR
R. M. FRAPS
BY
ATTORNEYS

INVENTOR
R. M. FRAPS

Feb. 6, 1945. R. M. FRAPS 2,368,655
WEIGHING SCALE
Filed June 21, 1943 4 Sheets-Sheet 4

INVENTOR
R. M. FRAPS
BY
ATTORNEYS

Patented Feb. 6, 1945

2,368,655

UNITED STATES PATENT OFFICE 2,368,655

WEIGHING SCALE

Richard M. Fraps, Beltsville, Md.

Application June 21, 1943, Serial No. 491,638

3 Claims. (Cl. 265—48)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

My invention relates to weighing scales, and more particularly to weighing scales employing a movable index line optically projected over the face of a screen bearing scale graduations.

In conventional types of even balance scales, both full sensitivity and maximal effective range of the scale are not ordinarily realized in the same construction. An extension of range is sometimes accomplished by the use of manually applied counterweights in combination with additional chart columns. However, this arrangement is cumbersome, and the several columns of figures composing the chart are a source of confusion unless additional means are employed to block out all columns except the one proper to the capacity range for the applied counterweight or counterweights.

In most laboratory and technical operations, it is essential to realize the greatest possible sensitivity at minimal capacity ranges, since the relative error of weighing operations is generally of greater significance than the absolute error. If a given maximal capacity is desired in a scale, the simplest means of increasing readability at lower capacity ranges is to increase, directly or indirectly, the length of chart, but in doing so an equal or greater scale sensitivity must be maintained. In the present invention, the base or primary chart range may be so limited as to realize the highest chart readability consonant with the sensitivity of a given construction, higher capacity ranges being attained by multiples of this base or primary chart and capacity range.

One object of this invention is to provide means for the rapid, semi-automatic application and removal of counterweights at fixed positions, and so chosen as to produce the desired multiplication of the basic chart range, this range being limited, in order to obtain a high degree of readability at lower capacity weighings.

A further object is to provide means for the automatic change of chart ranges simultaneously with the application and/or removal of counterweights to the end that those chart values proper to the sum of applied counterweights at a given setting are before the operator to the exclusion of all other numerical values.

A further object is to provide for utilization of the maximal number of counterweight and chart sequences theoretically attainable with a given number of counterweights applied at fixed positions, successive capacity ranges being understood as multiples of the base capacity range, that is, the range of the scale with no counterweights applied.

A further object is to provide means for locking the counterweight and chart mechanism in fixed and proper positions corresponding to the definite number of available scale ranges, and the provision of positive signals operative in conjunction with the locking device to eliminate all possibility that the operator may take chart readings except when chart and counterweights are in known and proper positions.

Other objects and advantages inhering in this invention will become evident from the following description.

My invention is illustrated by the accompanying drawings, in which.

Similar numerals refer to similar parts throughout the several views.

Figure 1:
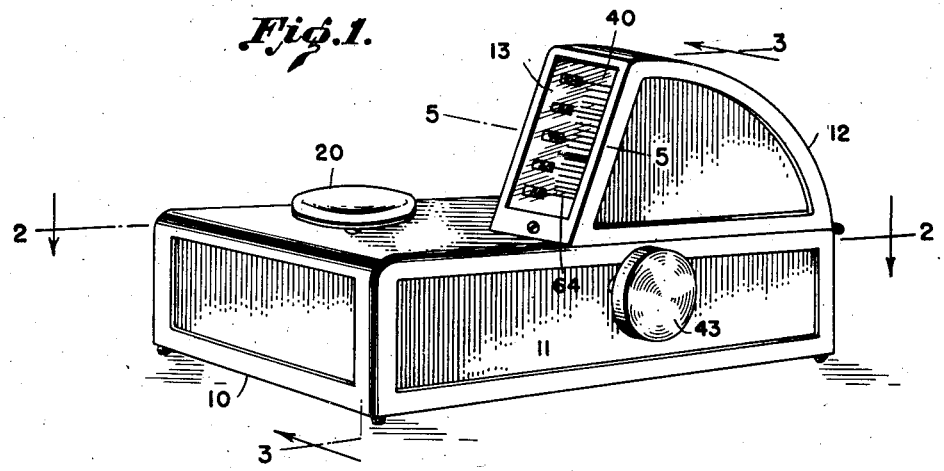
Figure 1 is a perspective view of a weighing scale embodying my invention.
Figure 4:
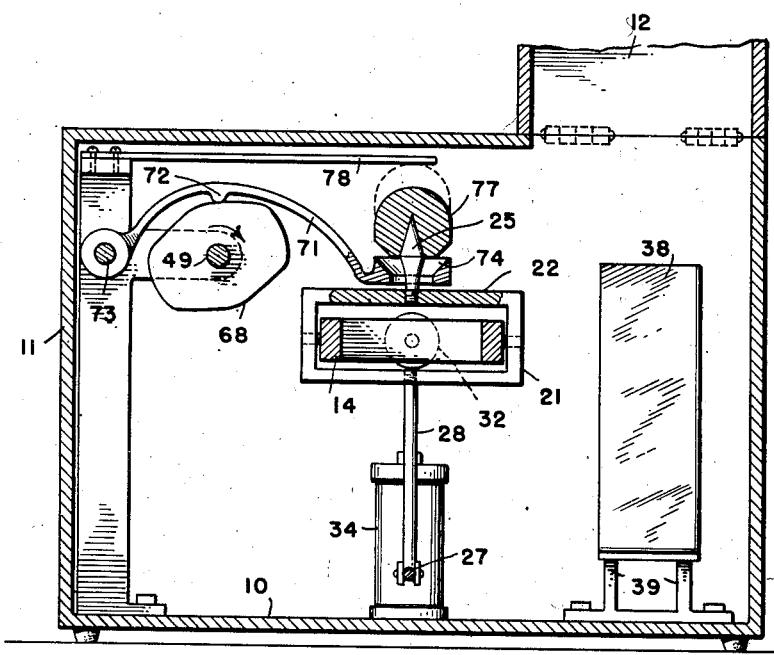
Figure 4 is a vertical section on the line 4—4 of Figure 2.
Figure 2:
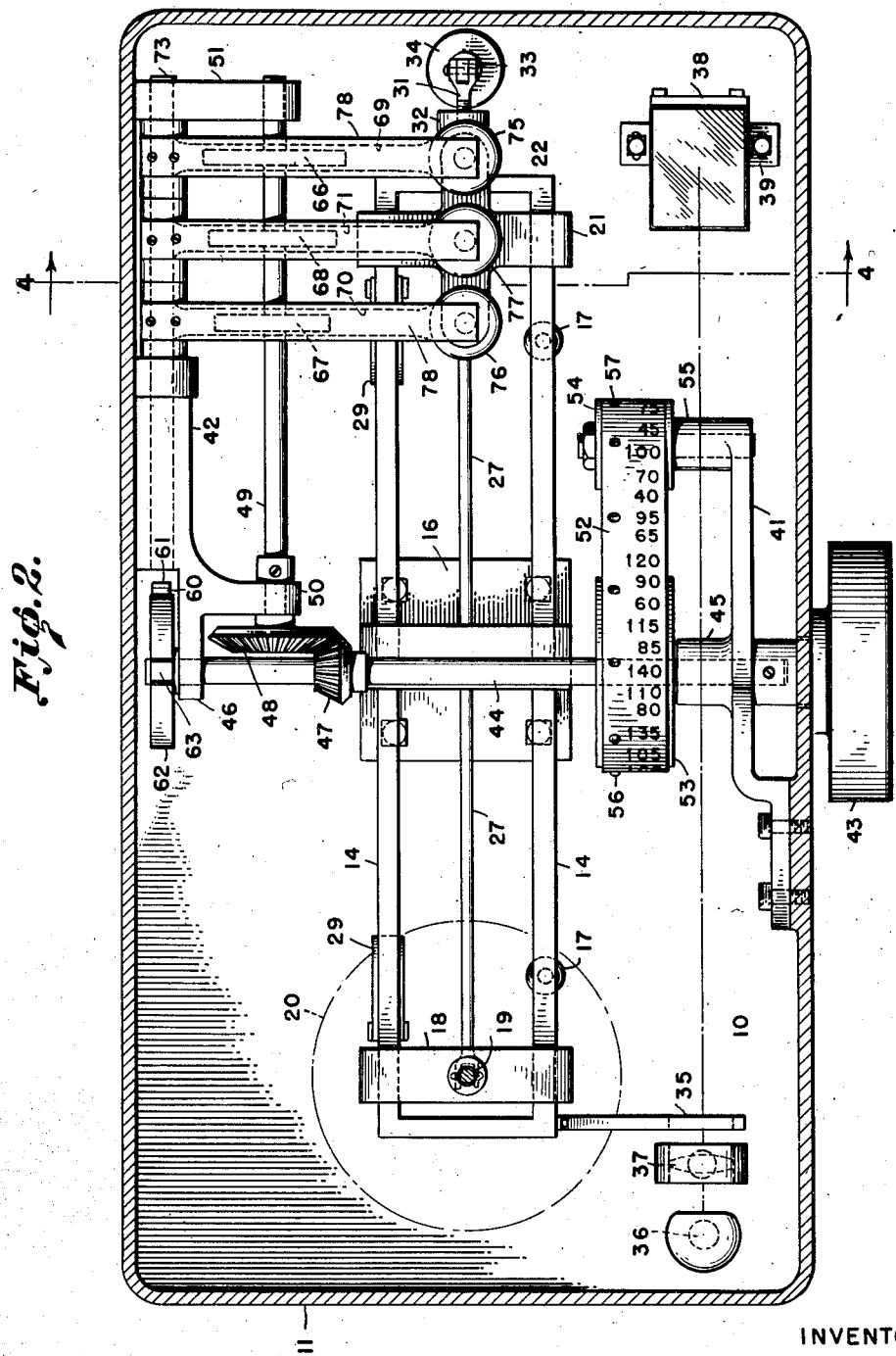
Figure 2 is a plan view with the housing removed on the line 2—2 of Figure 1.
Figure 3:
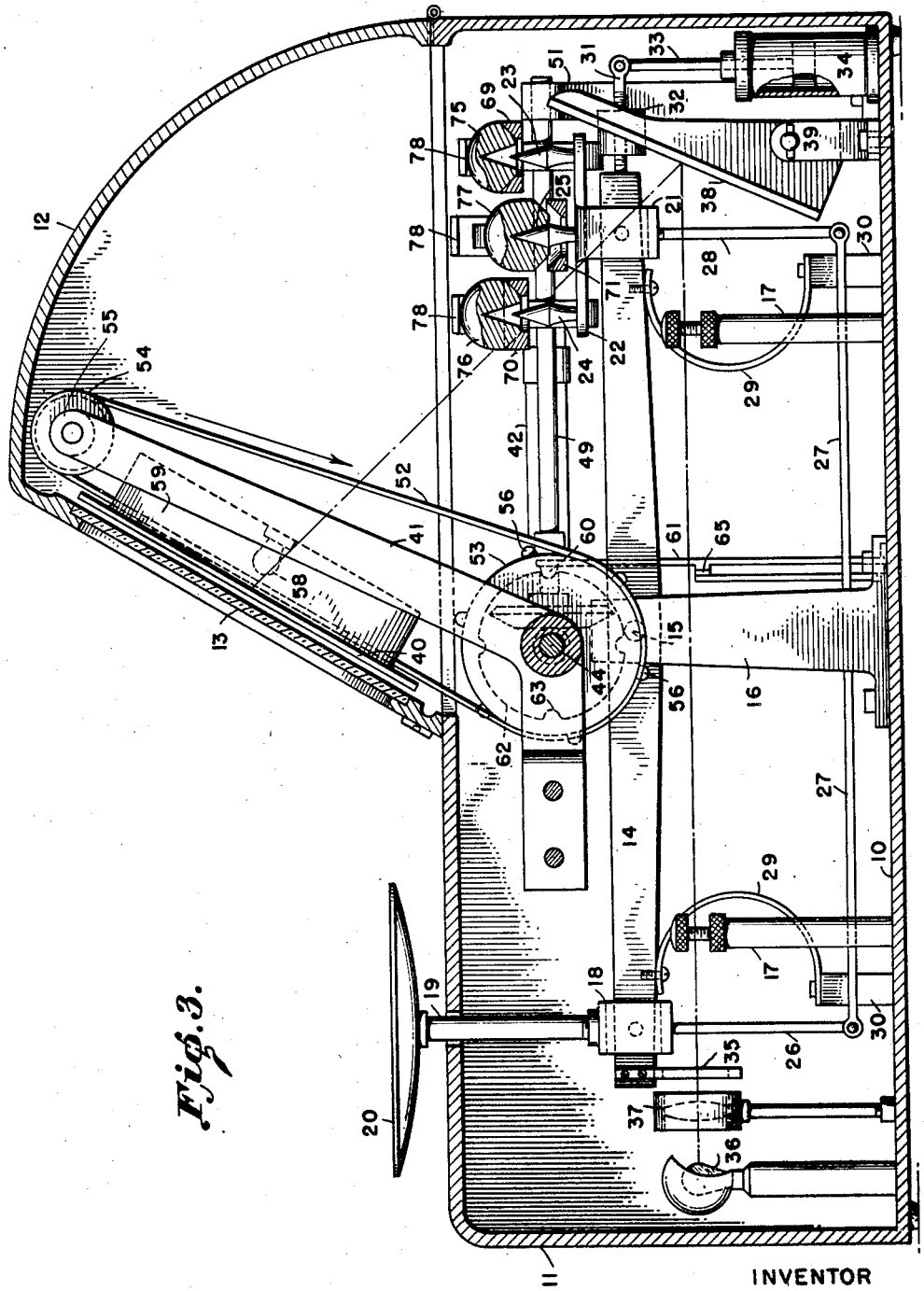
Figure 3 is a vertical section on the line 3—3 of Figure 1.

The weighing scale is mounted on a base 10, and is enclosed by a housing 11 on which a hood 12 is hinged. A glass window 13 through which scale readings can be observed is arranged in the hood 12.

The scale mechanism comprises a rectangular frame-like scale beam 14 supported substantially midway of its length by bearings 15 carried in a fulcrum standard 16 which is mounted on the base 10. Motion of the scale beam 14 is limited by adjustable stops 17. The forward end of the beam 14 carries the freely mounted outrider block 18 which is fitted with a standard 19 to carry the commodity platter 20. The other end of the beam 14 bears the counterweight outrider element 21 which is integral with the axially centered member 22 serving to carry the counterweight alignment cones 23, 24, and 25. The outriding beam elements 18 and 21 and superimposed elements are maintained in proper alignment by the usually disposed connecting links 26, 27, and 28, which form the appropriate parallelogram in conjunction with the beam 14.

The ends of the beam 14 are securely attached to opposed weight resistant elements 29, which in turn are fixed rigidly with respect to the beam fulcrum 16 through the blocks 30 to the base 10. Extending from the counterweight end of the scale beam is a clevis-headed screw 31, which carries the adjustable counterpoise 32 and which also is connected through the clevis to the link 33 which extends to the usual elements in the dashpot 34.

The capacity end of the beam carries a sidewardly projecting indicator element 35 in which a fine hair or equivalent is disposed horizontally at right angles to the longitudinal axis of the scale beam 14. In spaced relation with the indicator element 35 is a light source 36, the lens system 37, and the reflecting mirror 38 held by the adjustable bracket 39. The light source 36, lens 37, indicator 35, and mirror 38 are in alignment lengthwise and to the right side of the base 10, as is also that portion of the scale screen 40 bearing the scale graduations. In operation, movement of the beam 14 due to applied load displaces the optical beam indicator 35 vertically and thereby changes its position on the mirror 38, from which by reflection of lighted areas the indicator line is displaced on the scale screen 40 as a shadow parallel with the scale graduations. The arrangement of the optical system is such that displacement of the indicator line over the fixed scale graduations is proportional to the load applied to the commodity platter 20, a condition which may be satisfied by proper curvature in the reflecting mirror 38 or by other means known and practiced.

The main scale elements described up to this point, with the exception only of the counterweight alignment cones 23, 24, and 25 and their supporting base 22 are merely illustrative of construction known to those skilled in the art, and are intended to serve for the clearer presentation of the elements of my invention which follow.

In the following description, the embodiment of my invention in the form required by an eight-place chart and counterweight mechanism is taken as a sufficient example of its application, without implying limitation respecting its application generally.

The endless ribbon scale chart and counterweight assemblies are carried by brackets 41 and 42, respectively. A control knob 43 positioned externally on the right side of the housing 11 engages a shaft 44 which is supported in bearings 45 and 46 carried in the brackets 41 and 42. A bevel gear 47 carried on the shaft 44 engages a bevel gear 48 on a counterweight cam shaft 49, which shaft is supported in bearings 50 and 51 carried in the bracket 42. As illustrated, the bevel gears 47 and 48 are in the ratio 1:2, so that the shaft 44 will revolve twice while the counterweight cam shaft 49 revolves once.

The endless ribbon scale chart 52 is carried over a driving wheel 53 secured to the shaft 44 and over a free pulley 54, which revolves on bearing 55 of bracket 41. Lugs 56 circumferentially located on the driving wheel 53 engage perforations 57 in the endless ribbon scale chart 52, insuring absolute displacement of the scale chart proportional to the motion imparted to the driving wheel 53.

In its operative alignment the scale chart 52 lies immediately beneath the scale screen 40, and immediately to the left of that portion of the screen 40 which bears the fixed scale graduations. The portion of the screen 40 directly above the scale chart 52 is opaque except for translucent blocks or spaces placed in the screen 40 so that the numerals of a particular scale chart array will be visible when properly positioned. The arrays of chart numerals proper to given counterweight sums and corresponding capacity ranges appear in these blocks to the exclusion of all other chart numerals.

Figure 7:
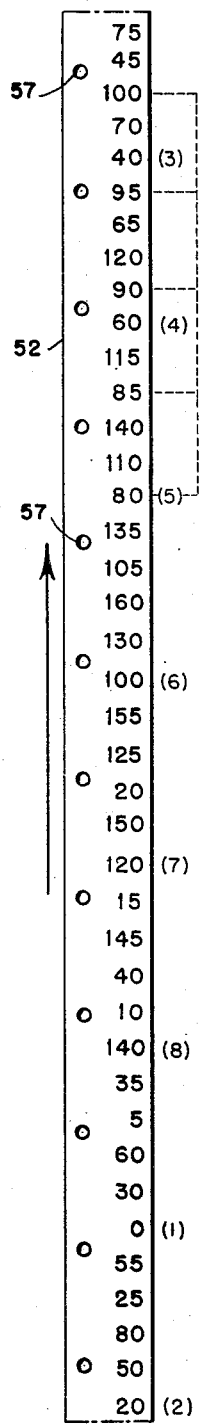
Figure 7 is a plan of the endless ribbon scale chart cut and viewed in the plane of the paper.
Figure 5:
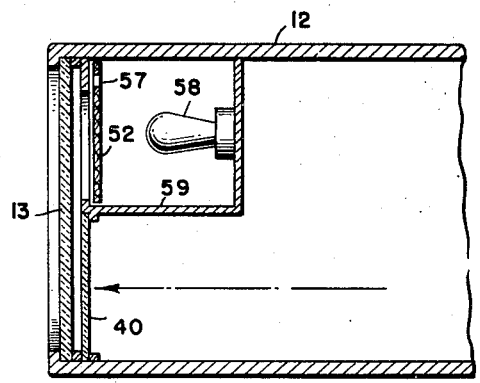
Figure 5 is a section on the line 5—5 of Figure 1 showing the scale screen assembly in plan.

The scale chart 52 provides, as illustrated, for eight consecutive capacity ranges which (again by way of example) are 0–20, 20–40 . . . 140–160 grams (or units). The scale chart 52 is accordingly subdivided into eighths of its length and capacity range bases 0, 20 . . . 140 are designated in correspondence with counterweight sums applied simultaneously as hereinafter described. These bases are indicated in Figure 7 opposite the figures in parentheses (1), (2) . . . (8) to the right of the ribbon chart. From a given base, the remaining numerals of the array are laid off at distance equal to the distance between major scale divisions. Proceeding similarly, the arrays corresponding to other capacity bases are laid off on the ribbon, completing the chart as shown. The array for the capacity base 80, comprising the numerals 80, 85, 90, 95, 100, is indicated by dotted lines in Figure 7, and is shown in operative position in Figure 1.

With a proper arrangement of the multiple arrays comprising a scale chart of the type described here, all numerals may be equally and closely spaced and the maximal usefulness of a chart of minimal length may thus be attained. Also, this makes it possible to hold the operative mechanism within reasonable limits. For example, with fixed scale graduations on scale screen 40 covering 4.5 inches and an eight-fold capacity range, the scale chart 52 need be only 15 inches in length with centers of driving wheel 53 and free pulley 54 separated by about 5.5 inches. Such a chart is, nevertheless, the equivalent, in total range, of a fixed chart 36 inches in length.

If in certain constructions longer ribbon charts are desired than are possible between a single driving wheel and a single free pulley, additional free pulleys may be provided to take care of the additional chart length in a compact manner.

The portion of the scale screen 40 beneath which the ribbon chart 52 travels is illuminated by light from a small bulb 58 inside a suitable shield 59. The shield 59 is designed so that diffuse light illuminates the figures of the scale chart 52 which are in operative position but the portion of the scale screen 40 bearing the scale graduations is shielded from the bulb 58, that portion of the scale screen 40 being illuminated only by light from the indicator light source 36 reflected by the mirror 38. Alternatively, suitable means may be employed to utilize light from the indicator light source 36 for illumination of the screen apertures through which the chart numerals are observed.

The length of the endless ribbon scale chart 52 in the present construction is twice the circumference of its driving wheel 53. Since the distance between successive capacity bases is ⅛ of the scale chart length, successive ¼ turns of the control knob 43 bring consecutive bases (and corresponding arrays) into the open blocks of the scale screen 40. Successive chart arrays are positioned quickly and positively by means of a lug 60 carried on a spring element 61 which causes it to bear against the rim of a positioning wheel 62 and to engage positioning seats 63 spaced at 90° intervals on the circumference of the positioning wheel 62. The positioning wheel 62 is fixed on the chart shaft 44 and is thus rotated with the control knob 43 and the chart driving wheel 53. When the positioning wheel 62 is so set that one of its seats 63 is in engagement with lug 60, and the chart base "0" or (1) appears in the space adjacent to the base graduation line 64, successive chart bases (and chart arrays) will be properly positioned as successive seats 63 are brought into engagement with the lug 60 as the positioning wheel 62 rotates.

Although engagement of the lug 60 with seats 63 of the positioning wheel 62 may be readily perceived during rotation of the control knob 43, supplemental means are provided to eliminate or minimize the possibility that scale readings may be taken with chart numerals other than those designating proper chart arrays before the observer. A contact breaker 65 is so interposed in the circuit supplying the scale screen bulb 58 that this bulb is lighted only when the lug 60 rests within one of the seats 63 of the positioning wheel 62. Identification of the capacity range proper to a given load is of course completed only when the optically projected index shadow (or pointer generally) comes to rest within the limits of fixed scale graduations on the scale screen 40.

Alternative constructions may be employed to indicate positively to the operator the correctness of chart array and disposition of counterweights. The scale chart 52 may carry, for example, a continuous marginal portion made opaque except for properly spaced and preferably narrow apertures which come successively into correspondence with a fixed similar aperture in an otherwise opaque marginal portion of the scale screen 40 as chart bases, but not other indicia, are brought into apposition with the base scale graduation 64. When, and only when, apertures in the scale chart 52 and the scale screen 40 are in correspondence, light from an interior source, for example, from the light sources 36 or 58, illuminates or is visible through the fixed screen aperture, indicating a proper setting for a given capacity range.

Again, capacity base indicia or the spaces proper to such indicia (0, 20 . . . 140 in the example previously followed) may be differentially colored, the appearance of such a differentially colored index or background against the fixed base scale graduation 64 signifying proper setting for given capacity range. In yet another example, regularly spaced segments of the scale chart 52, each equal in chart length to the segment of the chart required for index numerals, may be left vacant and preferably colored differentially. The blank space may, for example, be that immediately above each capacity base (1), (2) . . . (8), the remainder of the chart indicia being laid out in the manner described for charts without such spaces. At correct settings of the positioning wheel all apertures in the scale screen 40 are occupied by the numerals proper to a true chart array, no blank space appearing; at any other setting a blank space, differentially colored and patently dissimilar from other spaces, appears in one of the screen apertures, indicating improper setting.

The counterweight mechanism is operated by the control knob 43 simultaneously with the scale chart 52, the cam shaft 49 turning through a single revolution during the course of two revolutions of the scale chart shaft 44. The cam shaft 49 carries the three cams 66, 67, and 68, which when rotated by the shaft 49 raise and lower counterweight levers 69, 70, and 71 in definite sequence. Each counterweight lever rides upon its cam through a bearing block 72. The levers 69, 70, and 71 are pivoted at one end on a shaft 73, which is carried by the bracket 42. The free ends of levers 69, 70, and 71 terminate in annular seats 74, in which the counterweights 75, 76, and 77 rest when they are free of their counterweight cones 23, 24, and 25, and by which they are retained in accurate alignment for positioning on these cones.

Sufficient downward motion is arranged for the counterweight levers 69, 70, and 71, to assure that the annular seats 74 are not in contact either with the counterweights 75, 76, and 77 or the scale beam 14 at any point in the travel of the beam when counterweights are in applied position; similarly, the counterweights 75, 76 and 77 are raised sufficiently when they are free of the receiving cones 23, 24, and 25 to eliminate contact between counterweight and cone during motion of the beam 14 through its full traverse. To prevent accidental displacement of the counterweights 75, 76, and 77 when they are free of the beam 14, spring members 78, extending from the bracket 42, bear upon the heads of counterweights when these are free of their cones.

Figure 6:
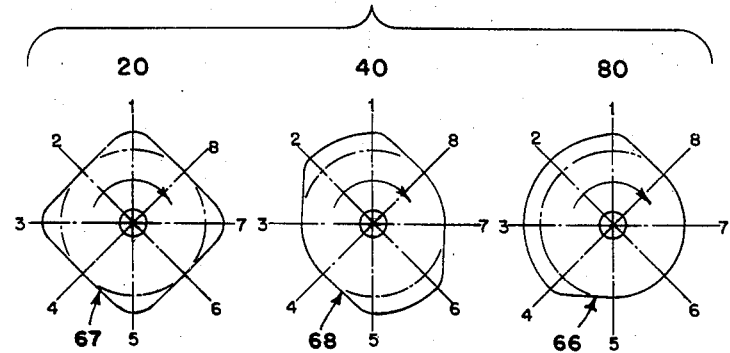
Figure 6 is a schematic representation of the cams used in the counterweight shifting mechanism.

The cams required for the eight-fold capacity range operating simultaneously with the eight-place ribbon chart previously described are schematically shown in Figure 6. Only three cams are required if the ratios of applied counterweights are powers of 2, that is, 1:2:4, or as in the present illustrative example, 20, 40, and 80 grams. The requisite cams 66, 67, and 68 are assigned to counterweights 75, 76, and 77, respectively, as indicated in Figure 6.

Eights radial positions, spaced 45° from adjacent positions, are designated for each cam by the radii, 1, 2 . . . 8, in Figure 6. Similarly designated radial positions are understood to be in axial alignment when the cams 66, 67, and 68 are in operative adjustment on the cam shaft 49. It should be understood also that when the counterweight levers 69, 70, and 71 ride the lesser radii of the cams 66, 67, and 68, the corresponding counterweights 75, 76, and 77 are applied to the scale beam 14; and when the counterweight levers ride the greater radii of the cams, the corresponding counterweights are free of the scale beam.

With radial position 1 of each cam bearing against its respective counterweight lever, as is indicated in Figure 6, all counterweights are free of the scale beam 14, the chart range of 0–20 grams is on the scale screen 40, and loads within this range are indicated directly on the fixed scale graduations. If, now, the counterweight cam shaft 49 is rotated in a clockwise direction by 45° (1/8 of a revolution), radial position 2 of each cam comes into play: the 20 gram counterweight 76 is applied to its receiving cone 24, but the 40 and 80 gram counterweight levers 69 and 71 continue to ride the outer radii of their cams. Since the required 45° rotation of the counterweight cam shaft 49 is given by a 90° rotation of the control knob 43 and the scale shaft 44, the scale chart 52 is displaced from its former position by ⅛ of its length, thus bringing into view the proper chart numerals for the capacity range 20-40 grams, (2) in Figure 7. By clockwise rotation of the cam shaft 49 through an additional 45°, radial position 3 of each cam becomes effective; the 20 gram counterweight 76 is lifted from the beam 14, the 40 gram counterweight 77 is simultaneously deposited on its receiving cone 25, and the 80 gram counterweight 75 continues to ride free of the beam 14. The capacity range is now 40-60 grams, (3) in Figure 7. Continuing to rotate the cams clockwise through radial positions 4, 5, 6, 7, and 8 brings up successively the capacity ranges 60-80, 80-100, 100-120, 120-140, and 140-160. From the radial position 8 a final rotation of the cams through 45° lifts all counterweights from the scale beam, bringing up again radial position 1 with simultaneously the return of chart numerals 0-20 upon the scale screen.

The detailed relations involved in the manipulation of three counterweights of weights 20, 40, and 80 grams in conjunction with chart capacity ranges of the same order are set forth below in table. It is particularly to be emphasized that successive positions of the counterweight cams 66, 67, and 68 and the scale chart 52 are realized simultaneously by rotation of the control knob 43 through 90° intervals, and precisely correct positions are likewise indicated for both counterweight cams and chart arrays by resistance of the positioning lug 68, in conjunction with illumination of the chart numerals only when the positioning lug 68 and consequently the counterweight cams are precisely positioned.

Table.—*Disposition of counterweights of 20, 40 and 80 grams (or units) in consecutive cam positions and for the total capacity range 0-160 grams by 20 gram increments*

| Radial cam position [1] | Disposition of counterweights [2] | | | Counterweight total on beam | Chart capacity range |
|---|---|---|---|---|---|
| | 20 | 40 | 80 | | |
| 1 (0°) | − | − | − | 0 | 0-20 |
| 2 (45°) | + | − | − | 20 | 20-40 |
| 3 (90°) | − | + | − | 40 | 40-60 |
| 4 (135°) | + | + | − | 60 | 60-80 |
| 5 (180°) | − | − | + | 80 | 80-100 |
| 6 (225°) | + | − | + | 100 | 100-120 |
| 7 (270°) | − | + | + | 120 | 120-140 |
| 8 (315°) | + | + | + | 140 | 140-160 |
| 1 (360°) | − | − | − | 0 | 0-20 |

[1] The numbered cam positions 1, 2 ... 8 refer to the positions so designated in Figure 6. The figures in parentheses (degrees) refer to clockwise rotation of cams from initial positions indicated in Figure 6.
[2] The plus sign (+) signifies that the indicated counterweight is applied to the scale beam, and the minus sign (−) signifies that the counterweight so designated is free of the scale beam.

While the elements and combination of elements comprising this invention have been described in a convenient embodiment, it is not intended that this limitation shall be considered in any sense inherent in the application of the invention. In the foregoing description, for example, it has been assumed that the counterweights are carried by an outrider element so disposed that the applied counterweight sum is accurately effective against capacity loads of the same magnitudes. However, the combination of elements embodied in this specified application is equally applicable to a construction employing a secondary beam, or other disposition of the outrider elements so that greater or lesser loads than those actually offset by the capacity weights are properly counterweighted. In other variations the scale chart may be adapted to provide a plurality of designated "over-under" chart indicia, these appearing before the operator simultaneously with the application or removal of the counterweight load required for the indicated capacity load. Again, the chart and applied counterweight loads may be designed to cover discontinuous ranges, thus increasing chart readability over each of several chart ranges which may be required in certain sequences of weighing operations.

Finally, the application of this invention is not limited to scales and balances employing an optically projected index pointer, although the advantages of constructions utilizing the optically projected pointer against fixed scale graduations can perhaps be most effectively realized in combination with such mechanism as is provided by this invention. The chart and counterweight mechanisms are applicable directly to simple balances, as for example, the analytical balance, in which application counterweights of calculated values may be operative with reference to differing fixed positions on the beam or suspended from the beam, the effective values of counterweights maintaining in either case the ratios of the binary number system and manipulated synchronously with a ribbon scale chart, or as a limiting case, a cylindrical dial, recording unambiguously the applied counterweight sums. In combination with the "chainomatic" balance, for example, all offsetting loads above the limit of the chain may be applied as counterweights and the sum read directly as the sole indicia of the chart visible to the operator at a given setting.

In certain constructions the ribbon scale chart may preferably carry only a part of scale indicia, the recurrent indicia being fixed in or on the scale screen in apposition to either major or minor scale graduations. This arrangement of scale indicia is of particular usefulness where capacity ranges are multiples, directly or indirectly, of a decimal base and small differences in indicated chart values are desired. In yet another contemplated application of this invention, two or more ribbon scale charts may be ranged parallel to each other and rotated at differential rates to bring before the observer, at defined and fixed positions, the capacity range proper to a given counterweight sum.

It may be pointed out, in connection with various applications which may appear at first sight to be unduly complicated, that with effective counterweight values taken always in ratios of powers of 2, only 4 counterweights are required for 16 consecutive multiples of a base range, and only 5 for multiplication of the base range 32 times. It is obvious that such multiplications of a given base capacity range would be of small value without means for the absolute identification of counterweight sums, which means are adequately provided by the ribbon scale chart or charts forming a part of this invention.

Having thus described my invention, I claim:

1. A weighing scale comprising a scale beam, a fulcrum support for said scale beam, a capacity platter mounted on one end of said scale beam, a series of counterweights mountable on the other end of said scale beam, the effective weights of said counterweights increasing in the ratio of serial powers of 2, means for disposing said counterweights on said other end of said scale beam, an endless ribbon multiple scale chart, the chart arrays on said scale chart being of equal length, the number of chart arrays being equal to $2^n$, where $n$ is the number of counterweights, the values on said scale chart being in equally spaced positions, and the values in any two consecutive positions on said scale chart being values of different chart arrays, means for operative correlation of said scale chart with the application of said counterweights, means distinguishing the operative chart array of said scale chart, and means for optically projecting an index of the position of said scale beam in relation to said scale chart.

2. A weighing scale comprising a scale beam; a fulcrum support for said scale beam; a capacity platter mounted on one end of said scale beam; a series of counterweights mountable on the other end of said scale beam, the effective weights of said counterweights increasing in the ratio of serial powers of 2; means for disposing said counterweights on said other end of said scale beam; an endless ribbon multiple scale chart, the chart arrays on said scale chart being of equal length, the number of chart arrays being equal to $2^n$, where $n$ is the number of counterweights, the values on said scale chart being in equally spaced positions except for regularly occurring blank positions, and any two adjacent values on said scale chart being values of different chart arrays; means for operative correlation of said scale chart with the application of said counterweights; means cooperating with the blank positions on said scale chart for defining the operative chart array of said scale chart; and means for optically projecting an index of the position of said scale beam in relation to said scale chart.

3. A weighing scale comprising a scale beam, a fulcrum support for said scale beam, a capacity platter mounted on one end of said scale beam, a series of counterweights mountable on the other end of said scale beam, the effective weights of said counterweights increasing in the ratio of the serial powers of 2, means for disposing said counterweights on said other end of said scale beam, an endless ribbon multiple scale chart, the chart arrays on said scale chart being of equal length, the number of chart arrays being equal to $2^n$, where $n$ is the number of counterweights, the base values of said chart arrays being spaced on said scale chart at intervals equal to the length of said scale chart divided by the number of chart arrays, the length of each chart array being greater than the interval on said scale chart between the base values of said chart arrays but not equal to a multiple of said interval and not greater than the length of the longest segment of said scale chart operatively disposed in a plane surface, and the distance between values on said chart arrays being selected so as not to equal any of the following: (1) the interval on said scale chart between the base values of said chart arrays, (2) an aliquot part of said interval, (3) a multiple of said interval, means for operative correlation of said scale chart with the application of said counterweights, means distinguishing the operative chart array of said scale chart, and means for optically projecting an index of the position of said scale beam in relation to said scale chart.

RICHARD M. FRAPS.